(12) United States Patent
Hardy et al.

(10) Patent No.: US 7,907,055 B2
(45) Date of Patent: Mar. 15, 2011

(54) SYNCHRONIZED RELAYED TRANSMISSIONS IN RFID NETWORKS

(75) Inventors: Leor Hardy, Givatayim (IL); Yariv Oren, Magshimim (IL)

(73) Assignee: Virtual Extension Ltd., Givatayiim (IL)

( * ) Notice: Subject to any disclaimer, the term of this patent is extended or adjusted under 35 U.S.C. 154(b) by 662 days.

(21) Appl. No.: 11/887,876

(22) PCT Filed: Mar. 30, 2006

(86) PCT No.: PCT/IL2006/000412
§ 371 (c)(1),
(2), (4) Date: Oct. 4, 2007

(87) PCT Pub. No.: WO2006/106504
PCT Pub. Date: Oct. 12, 2006

(65) Prior Publication Data
US 2009/0058652 A1 Mar. 5, 2009

Related U.S. Application Data

(60) Provisional application No. 60/668,980, filed on Apr. 7, 2005.

(51) Int. Cl.
*G08B 13/14* (2006.01)
(52) U.S. Cl. .................... 340/572.1; 340/10.1
(58) Field of Classification Search .......... 340/572.1
See application file for complete search history.

(56) References Cited

U.S. PATENT DOCUMENTS

| | | | | |
|---|---|---|---|---|
| 3,986,119 | A * | 10/1976 | Hemmer et al. | 455/15 |
| 5,804,810 | A * | 9/1998 | Woolley et al. | 235/492 |
| 6,972,682 | B2 | 12/2005 | Lareau et al. | |
| 7,019,664 | B2 * | 3/2006 | Turner et al. | 340/825.52 |
| 7,551,083 | B2 * | 6/2009 | Modes et al. | 340/572.1 |
| 2003/0014035 | A1 | 1/2003 | Tombley, III et al. | |
| 2003/0137968 | A1 | 7/2003 | Lareau et al. | |
| 2004/0174260 | A1 | 9/2004 | Wagner | |
| 2006/0164213 | A1* | 7/2006 | Burghard et al. | 340/10.2 |

* cited by examiner

*Primary Examiner* — George A Bugg
*Assistant Examiner* — Kerri McNally
(74) *Attorney, Agent, or Firm* — Susanne M. Hopkins; William L. Klima; Robert T. Burns

(57) ABSTRACT

Some embodiments of the invention relate to a circuit for allowing an RFID transponder to relay transmissions. According to some embodiments of the invention, a circuit for allowing a first RFID transponder to relay transmissions may include a logic module and a synchronization module. The logic module may be configured to operate in a relay mode. While in the relay mode, the logic module may be adapted to cause the first RFID transponder to relay a communication received at the transponder. The synchronization module may be adapted to synchronize the first RFID transponder with at least a second RFID transponder, such that the relay communication is synchronized with a communication relayed by the second RFID transponder.

53 Claims, 3 Drawing Sheets

SYNCHRONIZED RELAYED TRANSMISSIONS IN RFID NETWORKS

CROSS-REFERENCE TO RELATED APPLICATIONS

This is a National Phase Application filed under 35 U.S.C. 371 of International Application No. PCT/IL2006/000412, filed Mar. 30, 2006, claiming the benefit under 35 USC 119(e) of U.S. Provisional Application No. 60/668,980, filed Apr. 7, 2005, the entire contents of each of which is hereby incorporated herein by reference in its entirety.

FIELD OF THE INVENTION

This invention relates to RFID transponders.

BACKGROUND OF THE INVENTION

RFID is an automatic identification technology, relying on remote retrieval of data from relatively simple and inexpensive electronic devices called RFID transponders. RFID is a very promising technology and is expected to significantly benefit many fields, including commerce, medicine and security, to name just a few. However, despite its promise, RFID technology has thus far not been able to provide adequate robustness and reliability, which are essential requirements for many potential applications of the technology, without becoming too cumbersome and expensive.

The most common type of RFID transponders are passive tags. Passive RFID transponders have no internal power supply. In order to communicate with the RFID transponders, a central unit known as "the reader" emits radio frequency waves. The RFID transponder relies upon the signal from the reader for energy. For the RFID transponder to operate, an incoming radio frequency signal must induce a sufficient amount of current in the antenna of the tag to power the integrated circuit (IC) in the transponder and to enable the transponder to transmit a response.

It has been suggested to incorporate an internal power supply inside the RFID transponders to provide reliable energy. However, although an internal power supply can provide the energy needed to power-up the RFID transponder, active RFID transponders remain sensitive physical or electromagnetic barriers or obstacles in the path of a transmission from the RFID transponder to the reader (the uplink). For example, a RFID transponder attached to a package situated at the bottom of a relatively large stack of packages must overcome the physical obstacle created by the packages situated on top (and around) the package to which the transponder is attached, in addition to the greater physical distance to the reader. If the stack is large enough, the bottom transponders will not be able to reach the reader. On the other hand, the upper transponders have a much better chance of reaching the reader. The distance from the top packages to the reader is considerably shorter, and there are less packages (or non at all) in the path of the transmission to the reader.

What is needed is a method, a network and a circuit to enable an RFID transponder to relay a transmission from another RFID transponder. There is a further need for a method, a network and a circuit to enable two or more RFID transponders to relay a transmission from another RFID transponder in synchronous with one another. It is further needed to provide a method, a network and a circuit which enable RFID transponders to achieve substantially robust and relatively reliable communication.

SUMMARY OF THE INVENTION

Some embodiments of the invention relate to a circuit for allowing an RFID transponder to relay transmissions. According to some embodiments of the invention, a circuit for allowing a first RFID transponder to relay transmissions may include a logic module and a synchronization module. The logic module may be configured to operate in a relay mode. While in the relay mode, the logic module may be adapted to cause the first RFID transponder to relay a communication received at the transponder. The synchronization module may be adapted to synchronize the first RFID transponder with at least a second RFID transponder, such that the relay communication is synchronized with a communication relayed by the second RFID transponder.

According to some embodiments of the invention, the synchronization module may be adapted to synchronize the first RFID transponder in a manner to enable the transponder to transmit a communication substantially simultaneously with at least the second RFID transponder. According to further embodiments of the invention, the synchronization module may be adapted to synchronize the first RFID transponder with at least the second RFID transponder in a manner to enable at least two simultaneous communication paths for the relayed communication. According to still further embodiments of the invention, the logic module may be configured to cause the first RFID transponder to relay a communication received at the transponder from another RFID transponder, for example, from a third RFID transponder.

Further embodiments of the invention relate to a network of RFID transponders comprising at least a first and a second RFID transponder. According to some embodiments of the invention, each of the at least a first and a second RFID transponders may include a logic module and a synchronization module. The logic module of each of the first and second RFID transponders may be configured to operate in a relay mode during which, the logic module is adapted to cause the RFID transponder to relay transmissions received at the transponder. The synchronization module may be adapted to synchronize the at least the first and the second with one another, such that relay transmissions by said first and a second RFID transponders are synchronized.

According to some embodiments of the invention, the synchronization module of each of the at least first and second RFID transponders may be adapted to enable synchronization of each of the first and second RFID transponders, such that relay transmissions by the first and the second RFID transponders are synchronized. According to further embodiments of the invention, the logic module of each of the first and second RFID transponders may be adapted to cause the RFID transponder to relay a communication received at the transponder from a third RFID transponder.

Still further embodiments of the invention relate to a method of allowing an RFID transponder to relay transmissions. According to some embodiments of the method of allowing an RFID transponder to relay transmissions, a first RFID transponder may be switched to a relay mode during which the first RFID transponder may be adapted to relay a communication received at the transponder, and the first RFID transponder may be synchronized with at least a second RFID transponder. According to further embodiments of the invention, the first and the second RFID transponders may be synchronized in a manner to enable the first RFID transponder to transmit a communication substantially simultaneously with at least the second RFID transponder.

According to some embodiments of the invention, the first RFID transponder may be configured to relay a communication received at the transponder from another RFID transponder, while the logic module is in the relay mode.

According to some embodiments of the invention, the first RFID transponder may be switched to a relay mode in response to a receipt of an acknowledgment from a reader that a transmission from the transponder was received at the reader. According to further embodiments of the invention, the first RFID transponder may be switched to a reply mode in response to a receipt of a query directed at the transponder from a reader.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
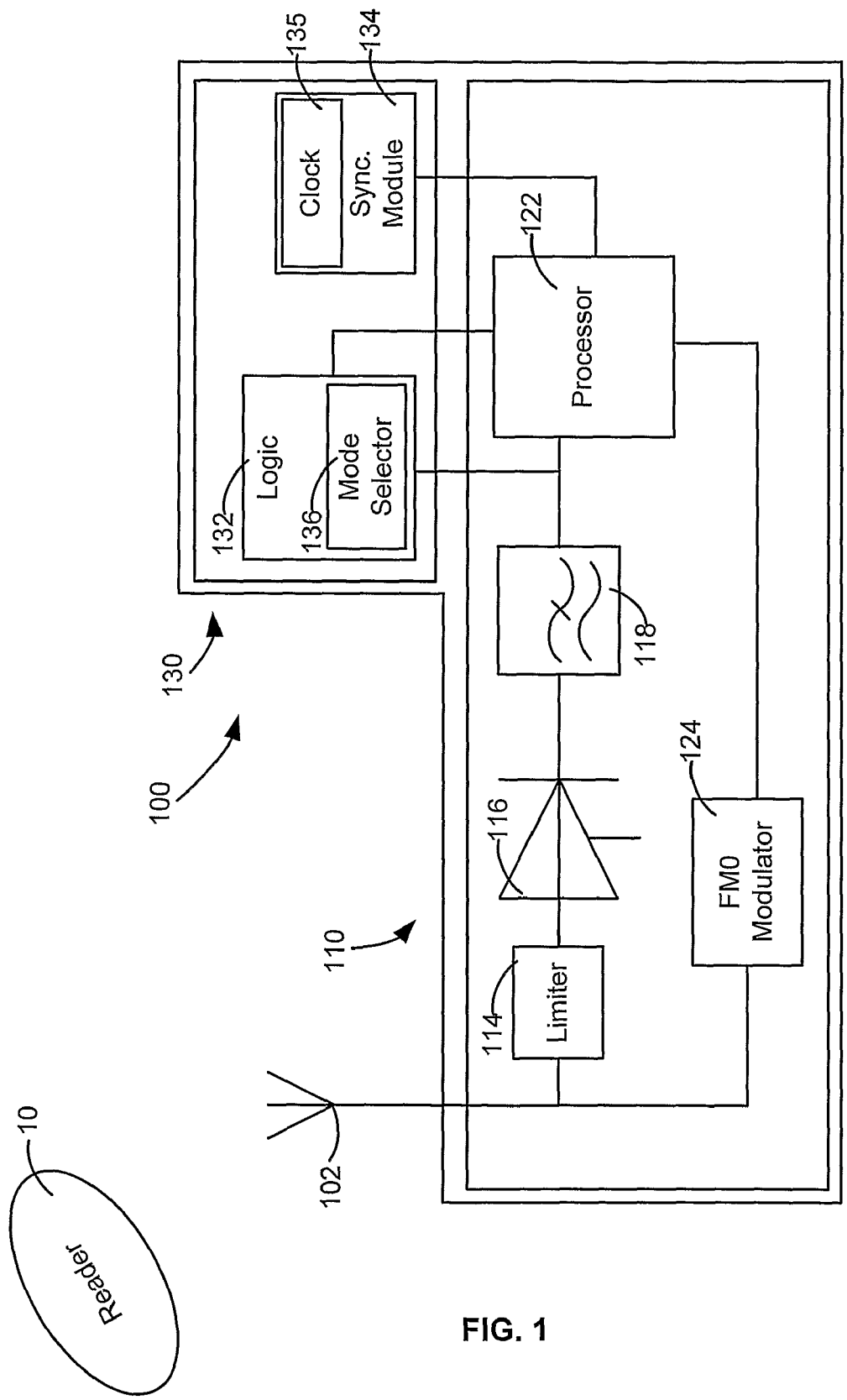
FIG. 1 is a block diagram illustration of an RFID transponder including a circuit for allowing an RFID transponder to relay transmissions, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

Some embodiments of the present invention relate to a circuit for allowing an RFID transponder to relay transmissions. According to some embodiments of the present invention, the circuit for allowing a first RFID transponder to relay transmissions may include a logic module and a synchronization module. The logic module may be configured to switch the first RFID transponder to a relay mode, during which the logic module is adapted to cause the first RFID transponder to relay a communication received at the transponder. The synchronization module may be adapted to synchronize the synchronization module may be adapted to synchronize the first RFID transponder with at least a second RFID transponder, such that the relay communication is synchronized with a communication relayed by the second RFID transponder. According to further embodiments of the invention, the synchronization module may be adapted to synchronize the first RFID transponder in a manner to enable the first RFID transponder to transmit a communication substantially simultaneously with at least the second RFID transponder. According to yet further embodiments of the invention, the logic module may be configured to cause the first RFID transponder to relay a communication received at the first RFID transponder from another RFID transponder.

Further embodiments of the invention relate to a network of RFID transponders including two or more RFID transponders, according to some embodiments of the invention, each of the at least a first and a second RFID transponders may include a logic module and a synchronization module. The logic module of each of the first and second RFID transponders may be configured to operate in a relay mode during which, the logic module is adapted to cause the RFID transponder to relay transmissions received at the transponder. The synchronization module may be adapted to synchronize the at least the first and the second with one another, such that relay transmissions by said first and a second RFID transponders are synchronized.

Still further embodiments of the invention relate to a method of allowing an RFID transponder to relay transmissions. According to some embodiments of the method of allowing an RFID transponder to relay transmissions, a first RFID transponder may be switched to a relay mode during which the first RFID transponder may be adapted to relay a communication received at the transponder, and the first RFID transponder may be synchronized with at least a second RFID transponder. According to further embodiments of the invention, the first and the second RFID transponders may be synchronized in a manner to enable the first RFID transponder to transmit a communication substantially simultaneously with at least the second RFID transponder. According to yet further embodiments of the invention, switching the first RFID transponder to the relay mode may further include configuring the first RFID transponder to relay a communication received at the first RFID transponder from another RFID transponder.

Reference is now made to FIG. 1, which is a block diagram illustration of an RFID transponder including a circuit for allowing an RFID transponder to relay transmissions, according to some embodiments of the present invention. The RFID transponder 100 shown in FIG. 1 may include RFID circuitry 110 and a circuit 130 for allowing the RFID transponder 100 to relay transmissions from other RFID transponders, according to some embodiments of the invention. The relay circuit 130 may be operatively connected to the RFID transponder 110. The functional relationship, according to some embodiments of the invention, between the relay circuit 130 and the RFID circuitry 110 shall be described below.

The RFID circuitry 110 according to some embodiments of the invention which is shown in FIG. 1 and described below, is a general representation of the typical circuitry found in many RFID transponders constructed in compliance with conventional RFID technology. In general terms, the RFID circuitry 110 of the RFID transponder 100 is adapted to receive a high-power modulated signal from a reader 10. Typically, in RFID systems, a signal from a reader 10 is transmitted by the reader 10 to a nearby RFID transponder or transponders for the purpose of interrogating the RFID transponder(s). The transmission from the reader 10 is intended to cause the RFID transponder(s) to respond via a returned transmission.

Upon receiving an interrogatory transmission from the reader 10, a receiving RFID transponder is configured to generate a response and to transmit the response back to the reader 10. In some cases, the RFID transponder may be configured to respond to an inquiry received from the reader with a certain preset response. In other cases, the reader 10 may request that specific information be returned. In such cases, the RFID transponder is required to process the incoming interrogatory transmission from the reader to determine what data is requested, and in response, the RFID transponder may generate a response including the requested data. Thus, some RFID transponders may include a processor or state machine 122 to enable the RFID transponder to process incoming transmissions and to generate a response based upon the incoming transmission.

In order to allow an RFID transponder 100 to generate and transmit a response, the reader 10 may be configured to transmit a (possibly un-modulated) carrier during a transponder's 100 response window (usually a predefined time-period) to provide the transponder 100 with the necessary energy for activating the RFID circuitry 110. The carrier (which may possibly be un-modulated) is used by the RFID transponder 100 to energize its components and elements so to allow the generation of an appropriate response and the transmission thereof. The response is typically transmitted by the RFID transponder 100 back to the reader 10 in a coded signal which is created by switching the reflectivity of a transponder's 100 antenna 102. The coded switching of the antenna's 102 reflectivity creates relatively weak AM spectral lines which the reader 10 is configured to detect. The RFID transponder 100 may be configured to repeat the response transmission to the reader 10 (so long as it is energized) until it receives an acknowledgement from the reader 10 that the transmission was received.

Some RFID transponders are implemented with an internal power source (not shown). The internal power source may allow the RFID transponder to generate the response and to transmit it even when the energy received from the reader 10 is not enough to energize the transponder's components, and may thus increase the range from which the RFID transponder can be activated. However, it would be appreciated by those of ordinary skill in the art, that an internal power source is not significantly effective for increasing the power of the RFID transponder's response transmission (it is the same reflection switching), and thus, does not in itself increase the likelihood of a response transmission being received at the reader 10.

In the exemplary implementation of the RFID transponder 110 shown in FIG. 1, an antenna 102 is provided for receiving a high-power modulated signal from a reader 10. For example, the antenna 102 may be configured to receive high power AM modulated signals 10 to which the RFID transponder 100 may be requested to respond. The antenna 102 may be operatively connected to the RFID transponder 100, so that when a signal is received at the antenna 102 it is fed to the RFID transponder 100. Upon entering the RFID transponder 100, the incoming signal may be passed through a limiter 114 which is adapted to limit the amplitude of the incoming signal. The limiter 114 may be provided in order to protect the RFID transponder 100 from being damaged by excessive power arriving from reader 10. The limiter 114 may be connected to an envelope detector 116 which is in turn connected to a low-pass filter 118. The envelope detector 116 may be configured to extract the data from the carrier signal, for example, via AM demodulation with some harmonics and noise, and the low-pass filter 118 is adapted to remove the harmonics and noise to provide a substantially clean data signal. The data signal may then be fed to a processor 122, where the data may undergo processing. As part of processing the data, the processor 122 may be configured to generate a response to the incoming signal. The processor's 122 response to the incoming signal may be based upon instructions from the reader 10, which may be included within the incoming signal. The response may include various data including, but not limited to, an ID of the RFID transponder, data relating to the time the transponder was last read, the number of times the transponder was read by the reader 10, etc. The processor 122 may include or be associated with the necessary logic and memory (not shown) to enable it to respond to the reader's 10 queries. The response generated by the processor 122 may be provided to an FM0 modulator 124. The FM0 modulator 124 may be configured to modulate the antenna's 102 reflection in accordance with the response generated by the processor 122 using FM0 modulation (also known as bi-phase space).

The processor 122 is configured to repeat the response transmission, until an acknowledgement is received from the reader 10 that the response signal was received. The processor 122 is adapted to identify the acknowledgement from the reader 10 as such, and specifically to differentiate an acknowledgement communication and an interrogation (or request for data) communication. The processor 122 may be adapted to identify other types of communications received at the transponder 100, as will be described below.

It would be appreciated that the above description of the functionality of the RFID circuitry 110 is a general description of the basic functionality of a typical RFID transponder. However, the above description is provided here only as a general overview of the functionality of conventional RFID circuitry and is purely exemplary in nature. It should be noted that some embodiments of the invention can be implemented in combination with many other configurations of RFID circuits, which may deviate from the above described RFID circuitry. Some embodiments of the present invention may be in compliance with any of the following RFID technologies and standards: the 900 MHz RFID standards, the ISO18000-6 standard, the EPC generation 2 standard, as well as other RFID technologies and combinations thereof.

As mentioned above, the RFID transponder 100 shown in FIG. 1 further includes a circuit 130 for allowing an RFID transponder to relay transmissions from other RFID transponders, according to some embodiments of the invention. According to some embodiments of the invention the relay circuit 130 may enable an RFID transponder 100 (a first RFID transponder) to relay communications, such as communications received from other RFID transponders, substantially synchronous with at least a second RFID transponder. The relay circuit 130 may include a logic module 132 and a synchronization module 134. The synchronization module 134 may be adapted to synchronize the (first) RFID transponder 100 with at least a second RFID transponder (not shown). According to further embodiments of the invention, the synchronization module 134 may be adapted to synchronize, and specifically bit-synchronize, the RFID transponder 100 with at least a second RFID transponder (not shown). The logic module 132 may be adapted to operate in a relay mode and in a reply mode. According to some embodiments of the invention, while in the relay mode, the logic module 132 may be adapted to cause the (first) RFID transponder 100 to relay a communication from another RFID transponder, for example, from a third RFID transponder, which was received at the (first) RFID transponder 100.

According to some embodiments of the invention, the synchronization module 134 may be configured to synchronize the first RFID transponder 100 with the source RFID transponder (the RFID transponder which originally transmitted the communication), and may be configured to transmit the relay communication (while the logic module 132 of the first RFID transponder 100 is in the relay mode) in synchronous with a repeated transmission of the communication by the source RFID transponder. It would be appreciated that, according to some embodiments of the invention, a source RFID transponder may be configured to repeat a transmission, and specifically a communication in response to an enquiry from a reader, until the end of a response window created by the reader, and that during the response window the first RFID transponder may receive the communication and may be configured to relay the communication. As mentioned above, the first RFID transponder 100 may be synchronized with the source RFID transponder, such that the first RFID transponder 100 is adapted to transmit a relay communication together with a repeated transmission of the communication by the source RFID transponder.

According to some embodiments of the present invention, the synchronization module 134 may include an internal clock 135. The synchronization module 134 may be adapted to synchronize the internal clock 135 with a central clock (not shown), for example, with the reader's 10 clock (not shown). According to some embodiments of the invention, the synchronization module 134 may adjust the internal clock 135, as necessary, based upon synchronization data included in a transmission from the reader 10. The synchronization data may be based upon the reader's 10 clock. The synchronization data may be included within each transmission from the reader 10, or the synchronization data may be via synchronization transmissions which the reader 10 may be adapted to generate from time-to-time.

According to some embodiments of the invention, at least a second RFID transponder with which the synchronization module 134 of the first RFID transponder is configured to be synchronized may also include an internal clock and may be configured to synchronize its internal clock with the reader's 10 clock. Thus, the first RFID transponder 100 and the second RFID transponder (not shown) may be capable of being synchronized with one another. It would be appreciated that internal clock synchronization is sensitive to environmental conditions, integrated circuit (IC) processing spread and other factors, and that as a result, synchronization may not be absolute. However, so long as the inaccuracies are kept substantially low, the inaccuracies may be considered to be negligible. It would be further appreciated, that the above described synchronization technique and mechanism are provided by way of example, and that in accordance with further embodiments of the invention, any suitable synchronization mechanism may be included as part of the synchronization module 134, and the synchronization module 134 may be configured to utilize any synchronization technique to synchronize the RFID transponder 100 with at least a second RFID transponder.

It would be appreciated that synchronizing the (first) RFID transponder 100 with at least a second RFID transponder, and specifically bit-synchronizing the RFID transponder 100 with at least a second RFID transponder, may enable multiple (two or more) synchronized relay transmissions. Multiple synchronized transmissions increase the likelihood of the response being received at the reader 10. Firstly, since the plurality (two or more) relaying RFID transponders provide multiple paths for the transmission being relayed. A plurality of transmission paths through which the response transmission is propagated towards the reader 10 increase the chance that one (or more) of the paths will eventually allow the response to be delivered to its destination—the reader. Secondly, multiple (two or more) synchronized relay transmissions may give rise to a "collaborative diversity effect". The collaborative diversity effect may enhance the strength of the field modulation caused by the plurality of identical transmissions occurring simultaneously, and may thus further contribute to the delivery of the transmission to the reader (its destination).

According to further embodiments of the invention, the logic module 132 may be adapted to toggle between a reply mode and a relay mode. The logic 132 module may be configured to switch between modes in accordance with predefined criteria or in response to a predefined event. According to some embodiments of the invention, the logic module 132 may receive an incoming signal (after it has been demodulated and filtered to remove harmonics and noise) and may identify the signal. The logic module 132 may be configured to identify an incoming signal by its header information or based upon any other data in the incoming transmission or based upon any data associated with the incoming transmission. As part of identifying an incoming transmission, the logic module 132 may use the processor 122 to process the incoming transmission. Alternatively, the logic module 132 may include an internal processor, here referred to as mode selector 136, which may enable the logic module 132 to identify incoming transmissions, at least for purposes of determining whether it should switch to a different mode. According to some embodiments of the present invention, the processor 122 or the mode selector 136 may be adapted to determine at which mode the logic module 132 should be, based upon data relating to the sender of the incoming transmission.

According to some embodiments of the invention, the logic module 132 may be configured to toggle between at least a reply and a relay mode. The nature of each of the reply mode and the relay mode shall be discussed in greater detail below. The logic module 132 may be configured to switch to the relay mode after the reader 10 acknowledges the receipt of a transmission from the RFID transponder 100. The logic module 132 may be configured to switch to the relay mode when the acknowledgement from the reader 10 is received at the RFID transponder. According to some embodiments of the present invention, the logic module 132 may be configured to switch to the reply mode in response to the receipt of a query from the reader 10 which is directed to the RFID transponder 100 of which the logic module 132 is part of.

Thus, according to some embodiments of the invention, the logic module 132 may be configured to be in the reply mode between the receipt of a query from the reader 10, which is intended for the RFID transponder 100 of which the logic module 132 is part of, and the acknowledgement thereof, and the logic module 132 is configured to be in the relay mode between the acknowledgement of a query from the reader 10 and the receipt of the next query from the reader 10.

According to some embodiments of the invention, while in the reply mode, the logic module 132 may be adapted to cause the RFID transponder 100 to be responsive to transmissions from the reader 10. According to further embodiments of the invention, while the logic module 132 is in the reply mode, the RFID circuitry 110 is configured to operate substantially in accordance with conventional RFID technology, for example, substantially in accordance with any of the conventional RFID technologies referred to above. Thus, according to some embodiments of the invention, while the logic module 132 is in the reply mode, the signal is returned from the logic module 132 to the RFID circuitry 110 without being modified by the relay circuit 130, and excluding any ancillary processing which may have been performed for the purpose of identifying the incoming transmission, without being processed. Thus, according to some embodiments of the invention, while the logic module 132 is in the reply mode, a query from a reader 10 is handled by the RFID circuitry 110, substantially without being affected by the relay circuit 130. It should be noted that according to some embodiments of the invention, while the logic module 132 is in the reply mode, the RFID transponder 100 is typically insensitive to transmissions from other RFID transponders, and in case such transmissions are picked up by the antenna 102 of the RFID transponder 100, they are typically ignored.

However, according to some embodiments of the invention, while the logic module 132 is in the relay mode, the logic module 132 is adapted to configure the RFID circuitry 110 to relay transmissions from other RFID transponders. According to some embodiments of the invention, while the logic module 132 is in the relay mode, the logic module 132 may be adapted to configure the RFID circuitry 110 to relay response transmissions from other RFID transponders to the reader 10. The logic module 132 may be further adapted to cause the RFID circuitry 110 to retransmit the transmission (from the other RFID transponder) without changing the content of the received transmission. Since in accordance with conventional RFID technology each RFID transponder is configured to inject into the response signal an ID (e.g., a GUID) corresponding to the transmitting RFID transponder, the logic module 132 may be configured to prevent the RFID circuitry 110 from injecting its own ID when repeating or relaying a transmission received from another RFID transponder. This may be achieved, for example, by an appropriate instruction to the processor 122. As a result, when the relayed transmission is received at the reader 10, the reader 10, based on the ID contained in the incoming transmission, will identify the transmission as arriving from the RFID transponder which is the source of the transmission rather than from any of the (one or more) transponders which were used to relay the transmission from the source RFID transponder to the reader 10.

According to some embodiments of the invention, while the logic module 132 is in the relay mode, the logic module 132 may be adapted to configure the RFID circuitry 110 to repeat a transmission received at the RFID transponder from another RFID transponder. According to some embodiments of the invention, while the logic module 132 is in the relay mode, the logic module 132 may be adapted to configure the RFID circuitry 110 to repeat the relay transmission after a predetermined time interval. According to further embodiments of the invention, while the logic module 132 is in the relay mode, the logic module 132 may be adapted to configure the RFID circuitry 110 to repeat the relay transmission after a pseudorandom time interval.

According to some embodiments of the invention, the logic module 132 may be adapted to configure the RFID circuitry 110 to repeat a relay transmission until the end of a response window or until an acknowledgement from the reader 10 is received that the transmission was received. As mentioned above, according to some embodiments of the invention, the reader 10 may transmit a (possibly un-modulated) carrier during a transponder's response window (usually a pre-defined time-period) to provide the transponder with the necessary energy for activating the RFID circuitry, and in the case of a relaying RFID transponder 100 to provide the transponder 100 with the necessary energy to enable the RFID circuitry 110 to transmit and repeat the relay transmission.

However, a reader 10 may be adapted to create an additional response window for receiving a response from a specific RFID transponder(s) which failed to respond to a query from the reader 10 during a previous response window. According to some embodiments of the invention, in case such an additional response window is created for receiving a response from a certain RFID transponder, an RFID transponder 100 which received the response transmission from the RFID transponder for which the additional response window was created, and whose own response transmission was acknowledged, may be instructed by its logic module 132 to continue repeating the relay transmission from the other RFID transponder, for example, until the end of the additional response window. Thus, according to some embodiments of the invention, the logic module 132 may be adapted to cause the RFID circuitry 110 to repeat a relay transmission, in case the logic module 132 identifies a request from the reader 10 which is directed (either explicitly or implicitly) towards another RFID transponder from which the current RFID transponder 100 received a transmission (directed at the reader) and relayed the transmission to the reader 10 but the relayed transmission was not acknowledged by the reader 10.

It should be noted, that the components of an RFID transponder constructed in accordance with some embodiments of the present invention may be implemented in software, hardware and in any combination thereof.

It would be appreciated that some embodiments of the invention may be utilized in combination with any suitable reader known in the present or yet to be devised in the future. Furthermore, some embodiments of the present invention may be utilized with many commercially available RFID readers without requiring any modifications to the reader. Some minor and obvious modification may however be required in case that the reader used deviated from the RFID standards.

Figure 2:
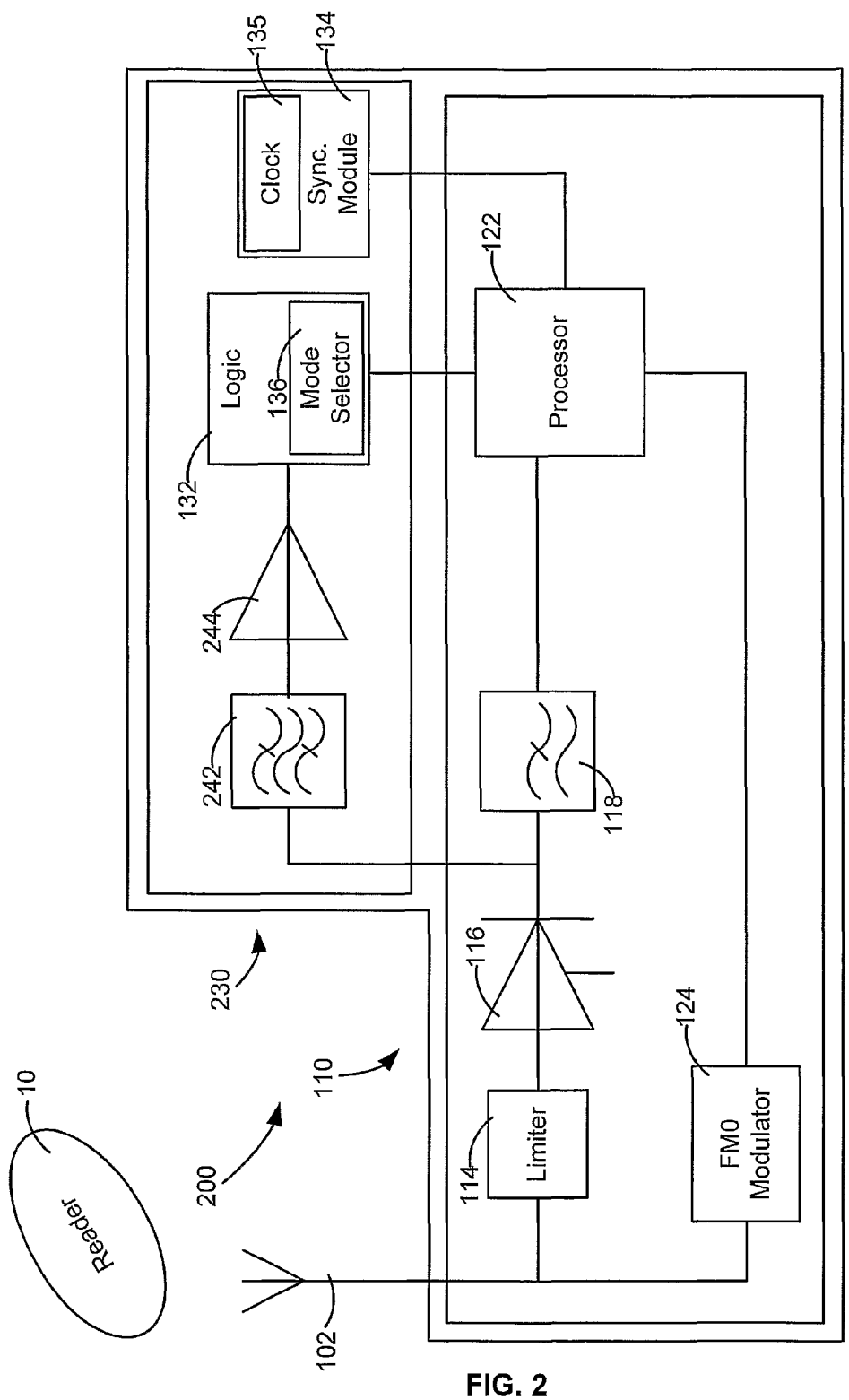
FIG. 2 is a block diagram illustration of an RFID transponder including a circuit for allowing an RFID transponder to relay transmissions, according to further embodiments of the present invention.

Reference is now made to FIG. 2, which is a block diagram illustration of an RFID transponder including a circuit for allowing an RFID transponder to relay transmissions, according to further embodiments of the present invention. In accordance with the embodiments of the invention shown in FIG. 2, the relay circuit 230 of RFID transponder 200 may additionally include a band-pass filter 242 and a high-gain amplifier 244. The band-pass filter b may be adapted to filter the N-th harmonic of the signal from other harmonics and noise which might introduce errors in the signal. The high-gain amplifier 244 may be adapted to amplify the filtered signal to allow reception of weak signals from distant transponders for example.

According to embodiments of the invention, the relay circuit 230 may further include an internal power source (not shown), specifically in case the RFID circuitry 110 does not include or is not otherwise associated with an internal power source. According to some embodiments of the invention, the power source may be used by the relay circuit 230 to provide the necessary power to the components of the relay circuit above and beyond the energy needed to energize the components of the RFID circuitry 110 (although the power source may be required to energize both). However, the present invention is not limited in this respect, and an RFID transponder according to some embodiments of the present invention may be implemented without an internal power source.

Figure 3:
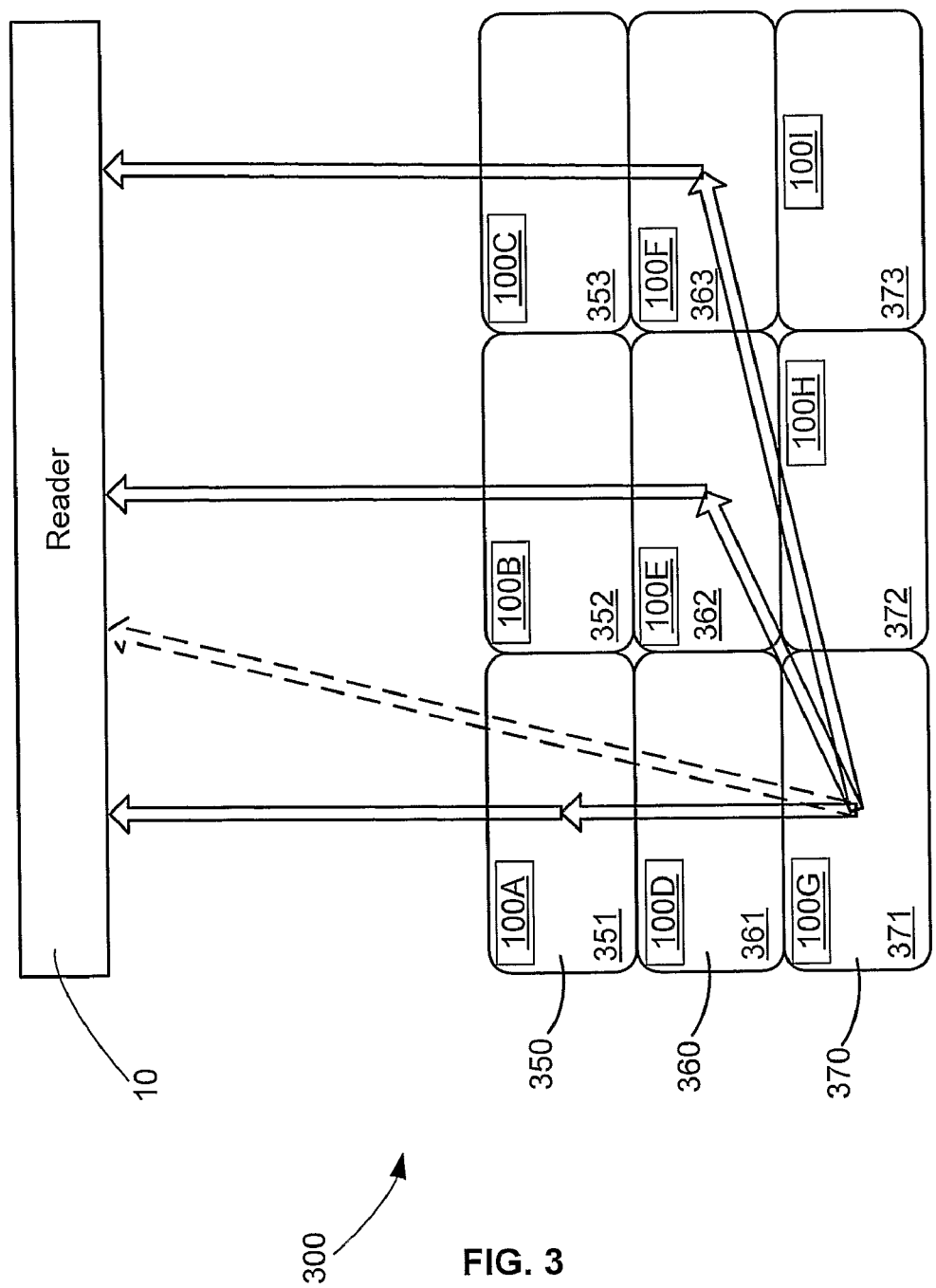
FIG. 3 is a block diagram illustration of a network of RFID transponders, according to some embodiments of the invention.

Reference is now made to FIG. 3, which is a block diagram illustration of a network of RFID transponders, according to some embodiments of the invention. According to some embodiments of the invention, a network of RFID transponders 300 may be comprised of a plurality (two or more) of RFID transponders 100A-100I, such as transponder 100 shown in FIG. 1, for example. In FIG. 2, each of the RFID transponders 100A-100I is attached to cases 351-353, 361-363 and 371-373. The cases in this example are arranged in three layers, layer 350 on top of intermediate layer 360 and layer 370 at the bottom. The RFID transponders of the present invention are not limited to being attached to any particular object or item, and may be attachable to any object including humans and animals. Furthermore, the present invention is not limited to any particular arrangement of objects or items to which the transponders may be attached.

In the embodiments illustrated by FIG. 3, the RFID transponder 100G associated with case 371 is unable to directly deliver a communication to the reader 10. The transmission from RFID transponder 100G associated with case 371 may fail to (directly) reach the reader 10 due to physical obstacles, electromagnetic interference, or as a result of other factors and a combination of factors. For example, in FIG. 3, the combination of physical distance between the RFID transponder 100G and the reader 10 and the cases placed between the RFID transponder 100G and the reader 10 prevents a transmission from the RFID transponder 100G associated with case 371 to reach the reader 10. Such obstacles or interferences may reduce the amplitude of the transmission or may distort the transmission and thus prevent it from reaching the reader 10 in an intelligible state. Unless stated otherwise, for the purposes of the present invention, a failed transmission is considered to include a received corrupted or unintelligible transmission.

According to some embodiments of the invention, although the transmission from the RFID transponder 100G associated with case 371 is not directly received at the reader 10, the transmission may be received at nearby RFID transponders 100A, 100E and 100F which are attached to cases 351, 362 and 363 respectively. It would be appreciated that the reduced physical distance to RFID transponders 100A, 100E and 100F in comparison to the distance to the reader 10, as well as the reduced number of cases through which the transmission is required to pass through in order to be received at each of RFID transponders 100A, 100E and 100F, may facilitate the receipt of the transmission by each of RFID transponders 100A, 100E and 100F, while not at the reader 10.

According to some embodiments of the invention, each of RFID transponders 100A, 100E and 100F include a relay circuit 130. As was described above, each relay circuit 130 includes a logic module 132 and a synchronization module 134. The logic module 132 of each of the RFID transponders 100A, 100E and 100F may be adapted to cause the respective RFID transponder 100A, 100E and 100F to relay a communication from another RFID transponder (in this case, from RFID transponder 100G), which was received at the RFID transponder 100A, 100E and 100F. In addition, the synchronization module 134 of each of the RFID transponders 100A, 100E and 100F may be adapted to synchronize the RFID transponders 100A, 100E and 100F with one another. Thus, the relay circuits of RFID transponders 100A, 100E and 100F RFID transponders 100A, 100E and 100F may be adapted to cause the respective RFID transponders 100A, 100E and 100F to synchronously repeat the communication from RFID transponder 100G. As mentioned above, the multiple synchronized transmissions by RFID transponders 100A, 100E and 100F increase the likelihood of the response being received at the reader 10, firstly, by providing multiple paths for the transmission being relayed, secondly, due to the collaborative diversity effect, and thirdly, since each of RFID transponders 100A, 100E and 100F is physically closer to reader 10 and is obstructed by less cases (or by none), the relayed transmission from one or more of the relaying RFID transponders 100A, 100E and 100F has a better chance of reaching the reader 10.

According to some embodiments of the invention, the logic module 132 may be adapted to configure the RFID circuitry 110 of each of the relaying RFID transponders 100A, 100E and 100F to relay the transmission received from the other RFID transponder, in this case, from RFID transponder 100G, without making changes to its content, and specifically without changing any identification data which provides data with respect to the source or the sender of the transmission. Thus, upon receiving a relayed transmission from one or more of the relaying RFID transponders 100A, 100E and 100F, the reader 10 may identify the relay as arriving form the RFID transponder 100G which is the original source of the transmission rather than as arriving from any of the RFID transponders which relayed the transmission. Thus, the connection between the data in the transmission and the source of the data may be maintained.

According to some embodiments of the invention, the relay circuit 130 may allow an RFID transponder 100 to relay a relayed transmission. For example the relayed transmissions from RFID transponders 100E and 100F may be received by RFID transponders 100B and 100C and may be relayed themselves, further increasing the probability of the signal being received by the reader 10.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It will also be understood that the system according to some embodiments of the invention may be a suitably programmed computer. Likewise, some embodiments of the invention contemplate a computer program being readable by a computerized device to allow an RFID transponder to relay transmissions, substantially as described hereinabove. Some embodiments of the invention further contemplate a machine-readable memory tangibly embodying a program of instructions executable by the machine to allow an RFID transponder to relay transmissions, comprising: switching a first RFID transponder to a relay mode during which the first RFID transponder is configured to relay a communication received at the transponder; and synchronizing the first RFID transponder with at least a second RFID transponder, such that the relay communication is synchronized with a communication relayed by the second RFID transponder.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A circuit for allowing a RFID transponder to relay transmissions, comprising:
   a logic module configured to operate in a relay mode, during which said logic module is configured to cause a first RFID transponder to relay a communication received at the first RFID transponder; and
   a synchronization module configured to synchronize the first RFID transponder with at least a second RFID transponder, such that the relay communication is synchronized with a communication relayed by the second RFID transponder,
   wherein said logic module is configured to switch the first RFID transponder to the relay mode in response to a receipt of an acknowledgment from a reader that a transmission originating from the first RFID transponder was received at the reader.

2. The circuit according to claim 1, wherein the communication received at the first RFID transponder is received from a third RFID transponder.

3. The circuit according to claim 2, wherein said synchronization module is configured to synchronize the first RFID transponder with at least the second RFID transponder in a manner to enable at least two substantially simultaneous communication paths for the communication received from the third RFID transponder.

4. The circuit according to claim 1, wherein said synchronization module is configured to synchronize the first RFID transponder with at least the second RFID transponder in a manner to enable the first RFID transponder to transmit the relay communication substantially simultaneously with the communication relayed by the second RFID transponder.

5. The circuit according to claim 1, wherein said logic module is configured to cause the first RFID transponder to relay the communication received at the first RFID transponder without changing its content.

6. The circuit according to claim 5, wherein while in the relay mode, said logic module is configured to prevent the first RFID transponder from changing the communication received at the transponder, such that the communication appears to a reader to be associated with another RFID transponder.

7. The circuit according to claim 5, wherein said logic module is configured to cause the first RFID transponder to relay the communication received at the transponder, such that the transponder is transparent to a receiver of the communication.

8. The circuit according to claim 5, wherein the communication is received at the first RFID transponder from another RFID transponder which generated the communication, and wherein the logic module is configured to prevent the first RFID transponder from modifying the received communication, such that the relay communication appears to a receiver to be associated with the other RFID transponder.

9. The circuit according to claim 1, wherein while said logic module is in the relay mode, said logic module is configured to cause the first RFID transponder to repeat the communication received at the transponder after predefined time intervals.

10. The circuit according to claim 9, wherein said logic module is configured to cause the first RFID transponder to repeat the communication received at the transponder during a response window created by a reader.

11. The circuit according to claim 10, wherein a source of the communication received at the first RFID transponder is a third RFID transponder, and wherein said logic module is configured to cause the first RFID transponder to continue repeating the communication received at the first RFID transponder in response to a further communication from the reader related to the third RFID transponder.

12. The circuit according to claim 1, wherein said logic module is configured to switch the first RFID transponder to a reply mode in response to a receipt of a query from a reader which is directed at the transponder.

13. A network of RFID transponders, comprising:
    at least a first and a second RFID transponder, each comprising:
      a logic module configured to operate in a relay mode during which, said logic module is configured to cause the respective RFID transponder to relay transmissions received at the transponder; and
    a synchronization module configured to synchronize at least the first and the second RFID transponders with one another, such that relay transmissions by said first and second RFID transponders are synchronized,
    wherein at least the logic module of said first RFID transponder is configured to switch said first RFID transponder to the relay mode in response to a receipt of an acknowledgment from a reader that a transmission originating from the first RFID transponder was received at the reader.

14. The network according to claim 13, wherein the synchronization module of each of said first and second RFID transponders is configured to enable synchronization of said first and second RFID transponders in a manner to enable the transponders to transmit a relay transmission substantially simultaneously with one another.

15. The network according to claim 14, wherein the synchronization module of each of said first and second RFID transponders is configured to enable synchronization of said first and second RFID transponders in a manner to enable at least two simultaneous communication paths for the relayed transmission.

16. The network according to claim 13, wherein the logic module of each of said first and second RFID transponders is configured to cause the RFID transponder to relay a communication received at the transponder from a third RFID transponder.

17. The network according to claim 13, wherein the logic module of each of said first and second RFID transponders is configured to cause the respective RFID transponder to relay a communication received at the transponder, such that the relaying transponder is transparent to a receiver of the communication.

18. The network according to claim 13, wherein the logic module of each of said first and second RFID transponders is configured to cause the respective RFID transponder to relay a communication received at the transponder without changing its content, such that the communication appears to a reader to be associated with a third RFID transponder.

19. The network according to claim 18, wherein the communication is received at each of the first and second RFID transponders from a third RFID transponder which generated the communication, and wherein the logic module of each of said first and second RFID transponders is configured to prevent the respective transponder from modifying the received communication, such that the relay communication appears to a receiver to be associated with the third RFID transponder.

20. A method of allowing an RFID transponder to relay transmissions, comprising:
    switching a first RFID transponder to a relay mode during which the first RFID transponder is configured to relay a communication received at the first RFID transponder; and
    synchronizing the first RFID transponder with at least a second RFID transponder, such that the relay communication is synchronized with a communication relayed by the second RFID transponder,
    wherein said switching further comprises switching the first RFID transponder to the relay mode in response to receipt of an acknowledgement from a reader that a transmission originating from the first RFID transponder was received at the reader.

21. The method according to claim 20, wherein said synchronizing comprises synchronizing the first RFID transponder in a manner to enable the transponder to transmit a communication substantially simultaneously with at least the second RFID transponder.

22. The method according to claim 21, wherein said synchronizing comprises synchronizing the first RFID transponder with at least the second RFID transponder in a manner to enable at least two simultaneous communication paths for the relayed communication.

23. The method according to claim 20, further comprising configuring the first RFID transponder to relay the communication received at the transponder from another RFID transponder, while the first RFID transponder is in the relay mode.

24. The method according to claim 20, further comprising configuring the first RFID transponder to relay the communication received at the transponder without changing its content, while the first RFID transponder is in the relay mode.

25. The method according to claim 20, wherein said switching further comprises switching the first RFID transponder to a reply mode in response to a receipt of a query from a reader that is directed at the first RFID transponder.

26. The method according to claim 20, wherein upon receiving a communication at the first RFID transponder while the transponder is in the relay mode, causing the first RFID transponder to repeat the communication after predefined time intervals during a response window created by a reader.

27. The method according to claim 26, further comprising configuring the first RFID transponder to continue repeating the communication received at the transponder in response to a further communication from the reader in connection with another RFID transponder which is a source of the relay communication.

28. A program storage device readable by machine, tangibly embodying a program of instructions executable by the machine to allow an RFID transponder to relay transmissions, comprising:
    switching a first RFID transponder to a relay mode during which the first RFID transponder is configured to relay a communication received at the transponder; and
    synchronizing the first RFID transponder with at least a second RFID transponder, such that the relay communication is synchronized with a communication relayed by the second RFID transponder,
    wherein said switching further comprises switching the first RFID transponder to the relay mode in response to receipt of an acknowledgement from a reader that a transmission originating from the first RFID transponder was received at the reader.

29. A circuit for allowing a RFID transponder to relay transmissions, comprising:
    a logic module configured to operate in a relay mode, during which said logic module is configured to cause a first RFID transponder to relay a communication received at the first RFID transponder; and
    a synchronization module configured to synchronize the first RFID transponder with at least a second RFID transponder, such that the relay communication is synchronized with a communication relayed by the second RFID transponder,
    wherein while said logic module is in the relay mode, it is configured to cause the first RFID transponder to repeat the communication received at the transponder after predefined time intervals during a response window created by a reader, and
    wherein the logic module of said first RFID transponder is configured to switch the transponder to the relay mode in response to a receipt of an acknowledgment from a reader that a transmission originating from the first RFID transponder was received at the reader.

30. The circuit according to claim 29, wherein said logic module is configured to cause the first RFID transponder to continue repeating the communication received at the transponder in response to a further communication from the reader related to another RFID transponder which is a source of the relay communication.

31. The circuit according to claim 29, wherein the communication received at the first RFID transponder is received from a third RFID transponder.

32. The circuit according to claim 29, wherein said synchronization module is configured to synchronize the first RFID transponder with at least the second RFID transponder in a manner to enable the first RFID transponder to transmit the relay communication substantially simultaneously with the communication relayed by the second RFID transponder.

33. The circuit according to claim 32, wherein said synchronization module is configured to synchronize the first RFID transponder with at least the second RFID transponder in a manner to enable at least two substantially simultaneous communication paths for a communication received from a third RFID transponder.

34. The circuit according to claim 29, wherein said logic module is configured to cause the first RFID transponder to relay the communication received at the transponder, such that the transponder is transparent to a receiver of the communication.

35. The circuit according to claim 29, wherein said logic module is configured to cause the first RFID transponder to relay the communication received at the first RFID transponder without changing its content, such that the communication appears to a reader to be associated with another RFID transponder.

36. The circuit according to claim 35, wherein the communication is received at the first RFID transponder from another RFID transponder which generated the communication, and wherein the logic module is configured to prevent the first RFID transponder from modifying the received communication, such that the relay communication appears to a receiver to be associated with the other RFID transponder.

37. The circuit according to claim 29, wherein said logic module is configured to switch the first RFID transponder to a reply mode in response to a receipt of a query from a reader which is directed at the transponder.

38. A network of RFID transponders, comprising:
    at least a first and a second RFID transponders, each of which comprising:
        a logic module configured to operate in a relay mode during which, said logic module is configured to cause the respective RFID transponder to relay transmissions received at the transponder; and a synchronization module configured to synchronize at least the first and the second RFID transponders with one another, such that relay transmissions by said first and second RFID transponders are synchronized, wherein while the logic module of said first or said second RFID transponder is in the relay mode, it is configured to cause the first RFID transponder or the second RFID transponder to repeat the communication received at the respective RFID transponder after predefined time intervals during a response window created by a reader, and wherein the logic module of said first and of said second RFID transponders is configured to switch the respective transponder to the relay mode in response to a receipt of an acknowledgment from a reader that a transmission originating from the respective RFID transponder was received at the reader.

39. The network according to claim 38, wherein the synchronization module of each of said first and second RFID transponders is configured to enable synchronization of said first and second RFID transponders in a manner to enable the transponders to transmit a relay transmission substantially simultaneously with one another.

40. The network according to claim 39, wherein the synchronization module of each of said first and second RFID transponders is configured to enable synchronization of said first and second RFID transponders in a manner to enable at least two simultaneous communication paths for the relayed transmission.

41. The network according to claim 40, wherein the logic module of each of said first and second RFID transponders is configured to cause the respective RFID transponder to relay a communication received at the respective transponder from a third RFID transponder.

42. The network according to claim 38, wherein the logic module of each of said first and second RFID transponders is configured to cause the respective RFID transponder to relay a communication received at the transponder, such that the relaying transponder is transparent to a receiver of the communication.

43. The network according to claim 38, wherein the logic module of each of said first and second RFID transponders is configured to cause the respective RFID transponder to relay a communication received at the transponder without changing its content, such that the communication appears to a reader to be associated with a third RFID transponder.

44. The network according to claim 43, wherein the communication is received at each of the first and second RFID transponders from the third RFID transponder which generated the communication, and wherein the logic module of each of said first and second RFID transponders is configured to prevent the respective transponder from modifying the received communication, such that the relay communication appears to a receiver to be associated with the third RFID transponder.

45. The network according to claim 38, wherein the logic module of said first and of said second RFID transponders is configured to switch the respective transponder to a reply mode in response to a receipt of a query from a reader which is directed at the respective RFID transponder.

46. A method of allowing an RFID transponder to relay transmissions, comprising:

in response to receipt of an acknowledgement from a reader that a transmission originating from a first RFID transponder was received at the reader switching the first RFID transponder to a relay mode, during which relay mode the first RFID transponder is configured to relay a communication received at the first RFID transponder; and synchronizing the first RFID transponder with at least a second RFID transponder, such that the relay communication is synchronized with a communication relayed by the second RFID transponder; and upon receiving the communication at the first RFID transponder while the transponder is in the relay mode, causing the first RFID transponder to repeat the communication after predefined time intervals during a response window created by a reader.

47. The method according to claim 46, wherein said synchronizing comprises synchronizing the first RFID transponder in a manner to enable the transponder to transmit the communication substantially simultaneously with at least the second RFID transponder.

48. The method according to claim 47, wherein said synchronizing comprises synchronizing the first RFID transponder with at least the second RFID transponder in a manner to enable at least two simultaneous communication paths for the relayed communication.

49. The method according to claim 46, further comprising configuring the first RFID transponder to relay the communication received at the transponder from another RFID transponder, while the first RFID transponder is in the relay mode.

50. The method according to claim 46, further comprising configuring the first RFID transponder to relay the communication received at the transponder without changing its content, while the first RFID transponder is in the relay mode.

51. The method according to claim 46, wherein a source of the communication received at the first RFID transponder is a third RFID transponder, and further comprising configuring the first RFID transponder to continue repeating the communication received at the first RFID transponder in response to a further communication from the reader related to the third RFID transponder.

52. The method according to claim 46, wherein said switching further comprises switching the first RFID transponder to a reply mode in response to a receipt of a query from a reader that is directed at the first RFID transponder.

53. A program storage device readable by machine, tangibly embodying a program of instructions executable by the machine to allow an RFID transponder to relay transmissions, comprising:

switching a first RFID transponder to a relay mode during which the first RFID transponder is configured to relay a communication received at the transponder;

synchronizing the first RFID transponder with at least a second RFID transponder, such that the relay communication is synchronized with a communication relayed by the second RFID transponder; and upon receiving the communication at the first RFID transponder while the transponder is in the relay mode, causing the first RFID transponder to repeat the communication after predefined time intervals during a response window created by a reader, and wherein said switching further comprises switching the first RFID transponder to the relay mode in response to receipt of an acknowledgement from a reader that a transmission originating from the first RFID transponder was received at the reader.

* * * * *